(12) United States Patent
Kato et al.

(10) Patent No.: US 6,621,950 B2
(45) Date of Patent: Sep. 16, 2003

(54) OPTICAL DATA BUS FIXING BOARD AND OPTICAL BACK PLANE BOARD

(75) Inventors: Makoto Kato, Aichi-ken (JP); Shoji Ito, Aichi-ken (JP); Akihiro Tanaka, Aichi-ken (JP); Kenichi Higashiura, Aichi-ken (JP)

(73) Assignees: AICA Kogyo Co., Ltd., Aichi-ken (JP); Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/113,528

(22) Filed: Mar. 29, 2002

(65) Prior Publication Data

US 2002/0141721 A1 Oct. 3, 2002

(30) Foreign Application Priority Data

Mar. 30, 2001 (JP) .......................................... 2001-099942

(51) Int. Cl.[7] ................................................. G02B 6/28
(52) U.S. Cl. ............................ 385/24; 385/31; 385/130
(58) Field of Search ............................. 385/24, 31, 47, 385/129, 130, 131, 132, 147

(56) References Cited

U.S. PATENT DOCUMENTS

| 5,822,475 A | * 10/1998 | Hirota et al. | .................. 385/24 |
| 5,987,198 A | * 11/1999 | Hirota et al. | .................. 385/24 |
| 5,995,262 A | * 11/1999 | Hirota et al. | ............... 359/163 |
| 6,097,864 A | * 8/2000 | Kropp | ......................... 385/44 |

FOREIGN PATENT DOCUMENTS

| JP | 2001-356236 | * 12/2001 | ............ G02B/6/28 |
| JP | 2002-40281 | * 2/2002 | ............ G02B/6/28 |
| JP | 2002-196174 | * 7/2002 | ............ G02B/6/28 |
| JP | 2002-243973 | * 8/2002 | ............ G02B/6/28 |

OTHER PUBLICATIONS

Wada, Osadu, "Optical Interconnecton Technology and Its Applications", Technical Survey, vol. 79, No. 9, Sep. 1996, pp. 906–909.

Ishikawa, Masatoshi, "Toward New Computing Systems with Optical Interconnections", vol. 1, No. 3, 1998, pp. 176–179.

Okada, Junji, Shinya Kyozuka, Tsutomu Hamada, Hidenori Yamada, Masao Funada and Takashi Ozawa, "Study on Backplane Optics and Apply to Optical Data Bus", New Business Center, Fuji Xerox Co., Ltd., 1999, 2 pages.

* cited by examiner

*Primary Examiner*—Tulsidas Patel
(74) *Attorney, Agent, or Firm*—Davis & Bujold, P.L.L.C.

(57) ABSTRACT

An optical data bus fixing board suitable for using an optical data bus as a signal transmission medium and an optical back plane board. A recess for inserting an optical data bus, which is made of a rectangular light transmissive resin substrate and comprises a step-wise side along the longitudinal direction and signal light incoming/outgoing areas formed by sloping the longitudinal end of each step at 45 degrees in relation to the substrate surface, is formed in the surface of a flat plate in order to easily and efficiently use the optical data bus as a signal transmission medium for interconnecting various signal processing circuits. The optical data bus is inserted and fixed within the recess by being pressed and biased from the back end by a first holding member including a reflective diffusion plate and from the side by a second holding member including a flat spring.

20 Claims, 6 Drawing Sheets

OPTICAL DATA BUS FIXING BOARD AND OPTICAL BACK PLANE BOARD

BACKGROUND OF THE INVENTION (i) Field of the Invention

The present invention relates to a fixing board for fixing an optical data bus comprising a long plate of a light transmissive material having one side formed into a step-wise configuration and signal light incoming/outgoing areas formed by sloping each end surface of each step approximately at 45 degrees in relation to the plate surface, and relates to an optical back plane board using the fixing board.

(ii) Description of the Related Art

To improve the processing performance of a signal processing unit, which employs a parallel architecture comprising a back plane board (mother board) and a plurality of nodes (daughter board), enhancement of the bandwidth by increasing the speed of transmission through a bus and bit multiplication has been sought.

Although further speed increase is required for such a signal processing unit employing a parallel architecture, the achievement of further speed increases using a conventional electrical wiring requires a circuit board design for reducing noises and delay with respect to the mother board and the daughter board. Optical fiber interconnection also has been introduced for increasing speed, even though it leads to further complicated wiring.

While increasing speed of a signal processing unit by the conventional electrical wiring is sought, increasing speed of a signal processing unit by intra-system optical interconnection technology called optical interconnection has been considered. As the outline of optical interconnection technology is described, for example, in The Transactions of the Institute of Electronics, Information and Communication Engineers, Vol.79 (No.9), September, 1996, "Optical Interconnection Technology and its Applications" by Osamu WADA, pp.907–909 and in Journal of Japan Institute of Electronics Packaging, Vol. 1, No.3 (1998), "Toward New Computing Systems with Optical Interconnection" by Masatoshi ISHIKAWA, pp.176–179, various forms may be proposed depending on the configuration of a system.

However, when optical interconnection utilizing optical fibers as a signal transmission medium is introduced not only into systems for industrial use but also into systems commonly used in offices and homes, there are problems, such as high packaging cost due to need for accurate positioning of optical connections and difficulty in realizing interconnection of multiple nodes with a simple structure.

Figure 6A:
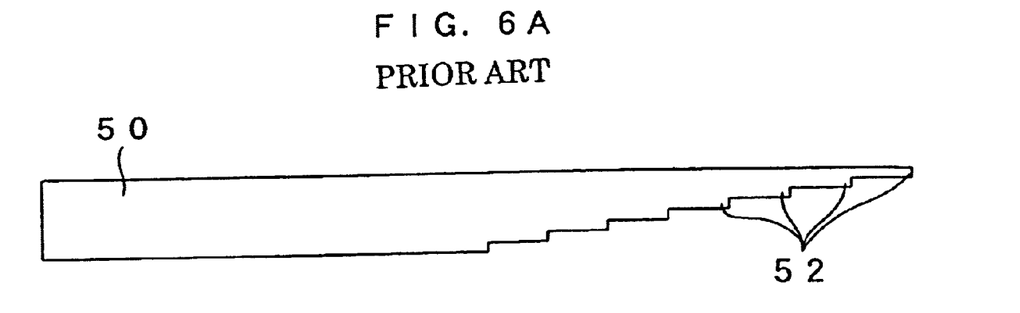
FIGS. 6A through 6C are explanatory views showing the structure and the state in use of the prior art optical data bus.
Figure 6B:
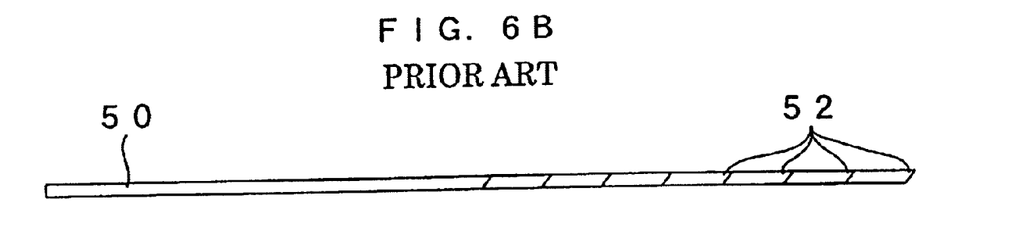
Figure 6C:
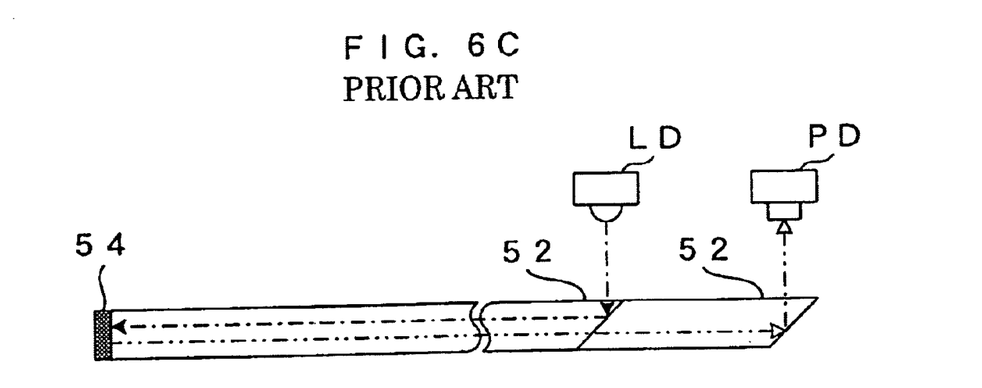

As technology to solve these problems, an optical data bus 50 as shown in FIG. 6 was proposed at The 25th Symposium on Optics, 2000, Lecture No. 8, "Study on Backplane Optics and Apply to Optical Data Bus" by Junji OKADA et al.

The optical data bus 50, which comprises a long plate of light transmissive material (for example, a light transmissive resin composed of an acrylic having a refractive index of 1.49 and an olefin polymer having a refractive index of 1.525, or the like), is a translucent transmission medium for transmitting signal light in the longitudinal direction by repetitive internal reflection.

Specifically, the optical data bus 50 comprises, as shown in FIGS. 6A and 6B, an approximately rectangular substrate of light transmissive resin having one longitudinal side thereof formed into a step-wise configuration, the steps being dimensioned such that light emitting elements (e.g. laser diode LD) or light receiving elements (e.g. photo diode PD) can be arranged from the side of one longitudinal end toward the other end. Signal light incoming/outgoing areas 52 are formed by sloping each longitudinal end of each of the steps at 45 degrees in relation to the surface of the substrate. FIG. 6A is a plan view of the optical data bus 50 and FIG. 6B is a side view thereof.

To perform optical transmission using the optical data bus 50, a reflective diffusion portion (e.g. light diffusive film) 54 is provided on the end surface opposite to the signal light incoming/outgoing areas 52 of the optical data bus 50 so that the optical data bus 50 has the diffusion angle in the thickness direction of 0.2 degrees and the diffusion angle in the width direction of 40 degrees. In addition, a laser diode LD or a photo diode PD is disposed above each of the signal light incoming/outgoing areas 52 such that each optical axis intersects perpendicularly to the substrate surface of the optical data bus 50.

Once the laser diode LD disposed above a given signal light incoming/outgoing area is activated and laser beam is irradiated from above the optical data bus 50, the entering light is totally reflected from the end surface sloped at 45 degrees in relation to the substrate surface of the optical data bus 50 and transmitted toward the reflective diffusion portion 54, then reflected and diffused from the reflective diffusion portion 54. The reflected light, in turn, is totally reflected from the end surface of each signal light incoming/outgoing area 52 and emitted from the top surface of the optical data bus 50. Thus, the optical signal emitted from the laser diode LD is transmitted to the photo diode PD disposed above the signal light incoming/outgoing area 52, with the result that the signal transmitted through the laser diode LD and the optical data bus 50 can be obtained from the current flowing through the photo diode PD.

Therefore, if a back plane board including the above described optical data bus as a signal transmission medium is put into practical use, it is possible to achieve interconnection, with a simple configuration, of a plurality of circuit boards provided with at least one of light emitting means comprising an electronic circuit for generating an electrical signal and a light emitting element for converting the electrical signal to an optical signal, and light receiving means comprising a light receiving element for converting an optical signal to an electrical signal and an electronic circuit for processing the converted electrical signal.

The use of the above described optical data bus as a signal transmission medium, however, presents problems of how to fix the optical data bus. Specifically, it is required to relatively position the optical data bus, the light emitting element and the light receiving element such that light is totally reflected from the signal incoming/outgoing areas and an optical signal is transmitted by repetitive internal reflection through the optical data bus, which is a translucent transmission medium. Also, since optical transmission in the optical data bus utilizes the air having a refractive index of 1 as a cladding layer, it is preferable not to use an adhesive for fixing the optical data bus. Further, since the optical signal totally reflected from the signal light incoming/outgoing area is required to be reflected and diffused from the other end of the optical data bus, a reflective diffusion portion such as a light diffusion film needs to be provided to the optical data bus in an appropriate manner.

However, there has not been provided any appropriate fixing means in order to use, as a signal transmission medium, an optical data bus having a step-wise configuration, as shown in FIGS. 6A to 6C. Therefore, an optical data bus fixing device which enables efficient transmission of an optical signal using an optical data bus is in demand.

The object of the present invention, which was meant to meet the demand, is to provide an optical data bus fixing board suitable for using the above described optical data bus as a signal transmission medium and an optical back plane board utilizing the optical data bus fixing board.

SUMMARY OF THE INVENTION

An optical data bus fixing board according to the present invention comprises a flat plate provided with a recess for insertion of an optical data bus opened corresponding to the surface configuration of the optical data bus and a positioning portion for positioning a light emitting element or a light receiving element in relation to each signal light incoming/outgoing area of the optical data bus inserted into the recess for insertion of an optical data bus, and is adapted such that the optical data bus inserted into the recess for insertion of an optical data bus in the flat plate is held by a first holding member provided on the longitudinally opposite side to each signal light incoming/outgoing area.

Therefore, the optical data bus can be fixed onto the optical data bus fixing board according to the present invention without using an adhesive. This enables the air having a refractive index of 1 to be used as a cladding layer of the optical data bus and decrease of the optical transmission efficiency in the optical data bus is prevented.

Also, since the light emitting element and the light receiving element can be positioned in relation to each of the signal light incoming/outgoing areas by using the positioning portions, the relative positions of these elements and areas can be set quite easily and precisely so that the light is totally reflected from the signal light incoming/outgoing areas.

The first holding member is provided with a reflective diffusion plate for abutting the end surface opposite to each of the signal light incoming/outgoing areas of the optical data bus and for reflecting the light entering through one of the signal light incoming/outgoing areas to the other signal light incoming/outgoing areas. By using the optical data bus fixing board according to the present invention, it is unnecessary to previously form a reflective diffusion portion at the end surface opposite to each of the signal light incoming/outgoing areas of the optical data bus. This not only simplifies production of an optical data bus, but also optimizes the reflective diffusion characteristics of light in the optical data bus since it is unnecessary to bond a reflective diffusion portion onto the optical data bus.

When a reflective diffusion portion, which is for reflecting and diffusing light at desired angles using the minute unevenness of its surface, is previously formed on an optical data bus, an adhesive is usually used. In this case, however, the unevenness is attenuated by the use of the adhesive and light cannot be reflected and diffused such that desired characteristics are obtained.

According to the present invention, wherein the first holding member is provided with the reflective diffusion plate which is adapted to abut the end surface of the optical data bus when the optical data bus is fixed onto the optical data bus fixing board, the light entering from one of the signal light incoming/outgoing areas can be reflected and diffused with desired characteristics. This enables the light emitted from the light emitting element to be surely transmitted to the light receiving element disposed above the signal light incoming/outgoing area.

The flat plate constituting the main body of the optical data bus fixing board may be made of resin, metal or a printed circuit board. In the case where a printed circuit board is employed, it is possible to form a power supply line and an electrical signal transmission line, or to mount electronic components constituting various signal processing circuits on the optical data bus fixing board In other words, the usability of the optical data bus is improved. Even the flat plate made of resin or metal, however, will have the same advantage if the flat plate is adapted such that the above mentioned lines can be formed thereon or a printed circuit board on which electronic components are mounted can be attached thereto.

When the flat plate is made of a printed circuit board, the board may be, for example, a multilayer board wherein a hole is provided in part of the stacked layers to form the recess for insertion of an optical data bus. The flat plate may be made of metal, but preferably is made of resin instead of metal because the difference of thermal expansion coefficient between a metal plate and the optical data bus is relatively large compared with a resin plate and therefore a metal plate is prone to damage the optical data bus.

The flat plate constituting the main body of the optical data bus fixing board may be provided with either a single recess for insertion of an optical data bus or a plurality of recesses for insertion of an optical data bus. When a plurality of recesses for insertion of an optical data bus are formed in the flat plate, a plurality of optical data buses may be installed on the common fixing board, which improves the operating efficiency in fixing the optical data buses in a device which uses a plurality of optical data buses as a signal transmission medium.

The plurality of recesses for insertion of an optical data bus are to be formed in the flat plate such that the signal light incoming/outgoing areas of the optical data buses are aligned on an orthogonal grid when the optical data buses are inserted into the recesses for insertion of an optical data bus.

Then, the light emitting elements or the light receiving elements can be disposed toward the respective signal light incoming/outgoing areas of a plurality of optical data buses by arranging the respective elements on the orthogonal grid. As described in the following embodiment, element holders holding respective elements and relatively positioned on the optical data bus fixing board may all be standardized.

When the plurality of recesses for insertion of an optical data bus are formed such that the signal light incoming/outgoing areas of the optical data buses inserted into the recesses for insertion of an optical data bus are aligned on the orthogonal grid, the flat plate (in other word, the optical data bus fixing board) is preferably formed into a rectangular so that the orthogonal grid lines are parallel or perpendicular to the side walls of the flat plate.

Thus, the above mentioned element holders may be aligned along the outer shape of the flat plate when fixed onto the optical data bus fixing board, and therefore it is easy to confirm whether or not the relative position of the element holder (i.e. the light emitting element or the light receiving element) relative to the optical data bus fixing board (i.e. the signal light incoming/outgoing area of the optical data bus) is precise, then positioning of respective portions is properly performed.

The first holding member, which is required to hold the end of the optical data bus opposite to each of the signal light incoming/outgoing areas, may be constituted to press the end from above the board, but preferably is constituted to press and bias the reflective diffusion plate against the end surface of the optical data bus using an elastic member. This enables fixation of the reflective diffusion plate to the optical data bus and, at the same time, fixation of the optical data bus within the recess for insertion of an optical data bus.

The elastic member for pressing and biasing the reflective diffusion plate against the end surface of the optical data bus may be a buffer material, such as rubber, or a spring, such as a flat spring or a coil spring. Since the reflective diffusion plate needs to be securely abuttingly fixed to the end surface of the optical data bus without being influenced by oscillation or thermal expansion (or shrinkage) of the optical data bus, the elastic member is more preferably one or more coil springs whose compressive force causes the reflective diffusion plate to be pressed and biased against the end surface of the optical data bus.

The optical data bus, which is made long, may come off the recess for insertion of an optical data bus even when one end of the optical data bus is held by the first holding member. Therefore, it is more preferable to provide a second holding member for holding the optical data bus inserted into the recess for insertion of an optical data bus on a side wall of the optical data bus along the longitudinal direction.

The second holding member, which is required to hold the optical data bus on the side wall thereof, may be constituted, for example, to press an end portion of the side wall from above the board. It is more preferable, however, that the second holding member is constituted to press and bias the side wall of the optical data bus by an elastic member, for the second holding member of this type can be formed with a simple structure and, in addition, the side wall of the optical data bus opposite to the second holding member is caused to abut the inner wall of the recess for insertion of an optical data bus and the optical data bus is securely held within the recess for insertion of an optical data bus.

In this case, the elastic member may be a buffer material, such as rubber, or a spring, such as a flat spring or a coil spring. In view of the function of the second holding member that it presses and biases on the longitudinal side wall of the long optical data bus, it is preferable to employ a flat spring which can bring its surface into contact with the side wall of the optical data bus and bias the side wall.

Since the second holding member needs to hold the long optical data bus on the longitudinal side wall thereof, the optical data bus can be held more securely when a plurality of the second holding members are provided for one optical data bus.

The recess for insertion of an optical data bus, which only needs to receive the optical data bus, may have approximately the same configuration as the optical data bus. It is preferable, however, that the configuration of the recess for insertion of an optical data bus is larger than the configuration of the optical data bus. This prevents the optical data bus from interfering with the recess for insertion of an optical data bus even when the optical data bus expands due to, for example, a thermal change in the ambient atmosphere, and also improves operating efficiency when the optical data bus is inserted into the recess for insertion of an optical data bus.

However, when the configuration of the recess for insertion of an optical data bus is larger than the configuration of the optical data bus, it becomes difficult to properly position the optical data bus (i.e. respective signal light incoming/outgoing areas) on the flat plate (i.e. the optical data bus fixing board). Accordingly, it is preferable to previously form a positioning projection on a side wall of the optical data bus and an engaging portion corresponding to the positioning projection in the side wall of the recess for insertion of an optical data bus along the longitudinal direction of the optical data bus.

Another aspect of the present invention relates to an optical back plane board comprising the above described optical data bus fixing board and the optical data bus inserted into the recess for insertion of an optical data bus of the optical data bus fixing board. The use of the optical back plane board, wherein the optical data bus is fixed onto the optical data bus fixing board according to the present invention, enables considerably simple connection between a plurality of circuits using the optical data bus as a signal transmission medium, once the light emitting elements and the light receiving elements (specifically the element holders) are positioned by using the positioning portions formed in the optical data bus fixing board.

Therefore, the optical back plane board facilitates achievement of information processing unit including a parallel architecture which supports speeding up of transmission and enables interconnection of multiple nodes with a simple architecture.

BRIEF DESCRIPTION OF THE DRAWINGS

A preferred embodiment of the present invention will now be described with reference to the drawings in which.

DETAILED DESCRIPTION OF A PREFERRED EMBODIMENT

Figure 1:
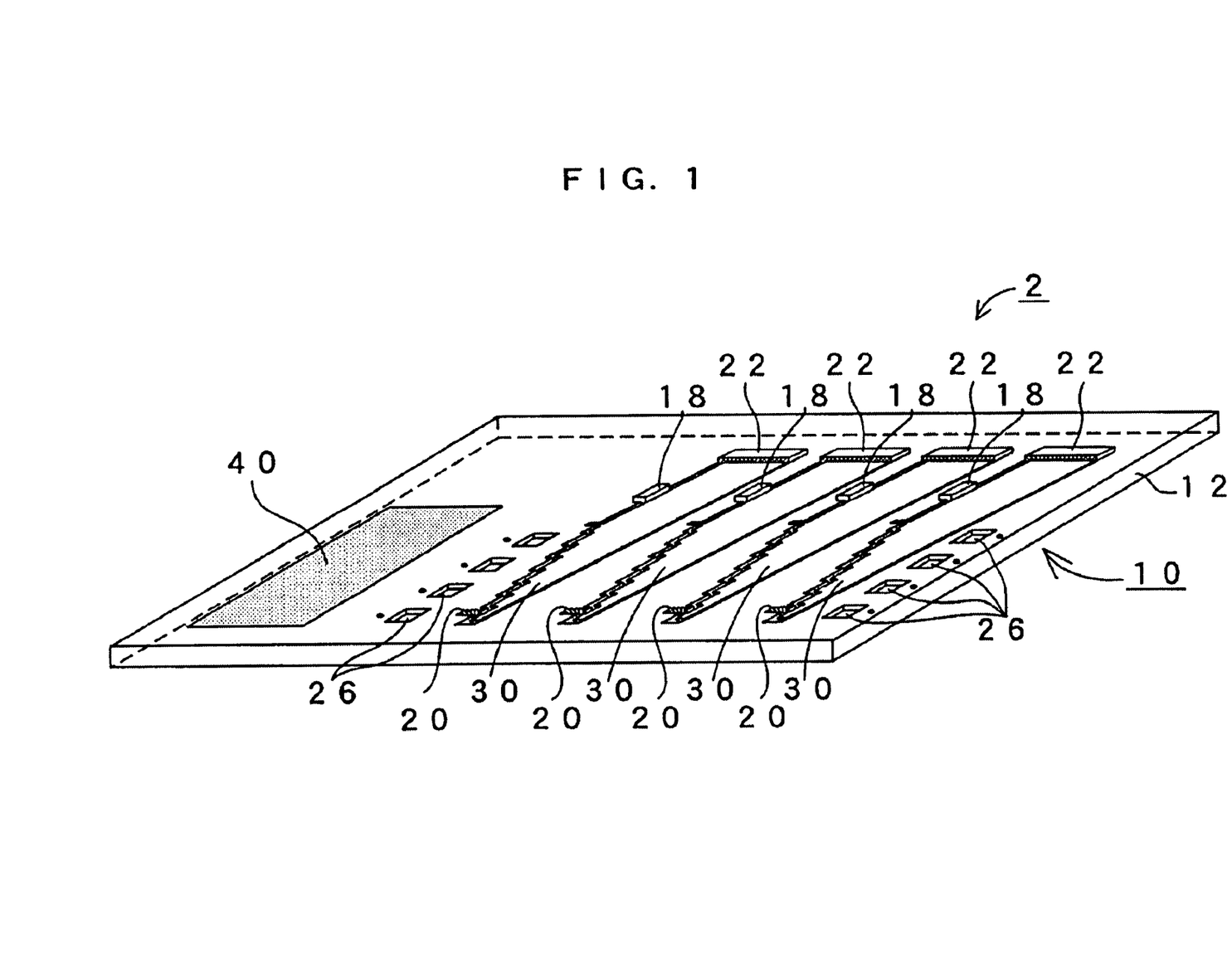
FIG. 1 is a perspective view showing the entire structure of an optical back plane board according to the present embodiment.
Figure 2:
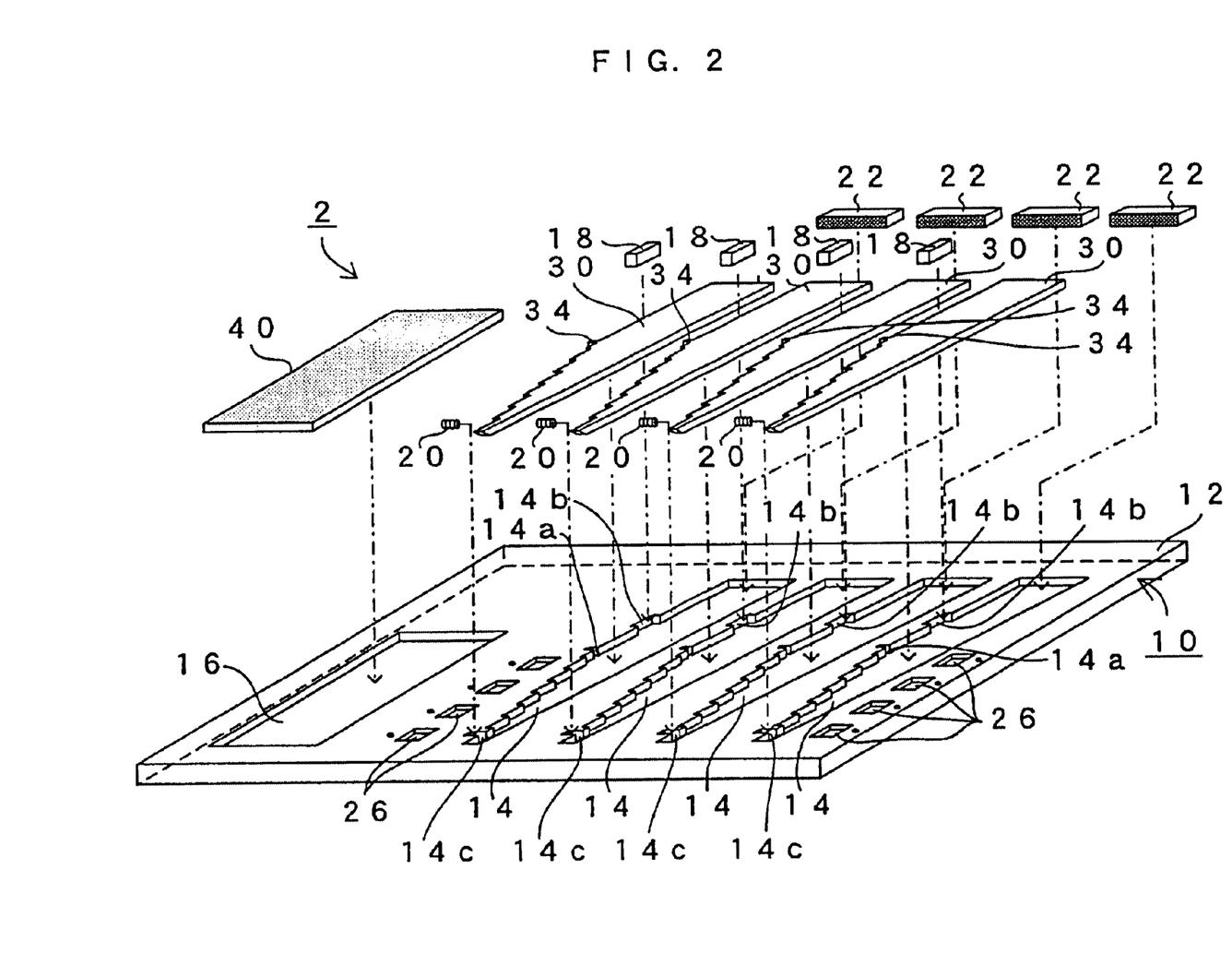
FIG. 2 is an exploded perspective view of the optical back plane board according to the present embodiment.
Figure 3:
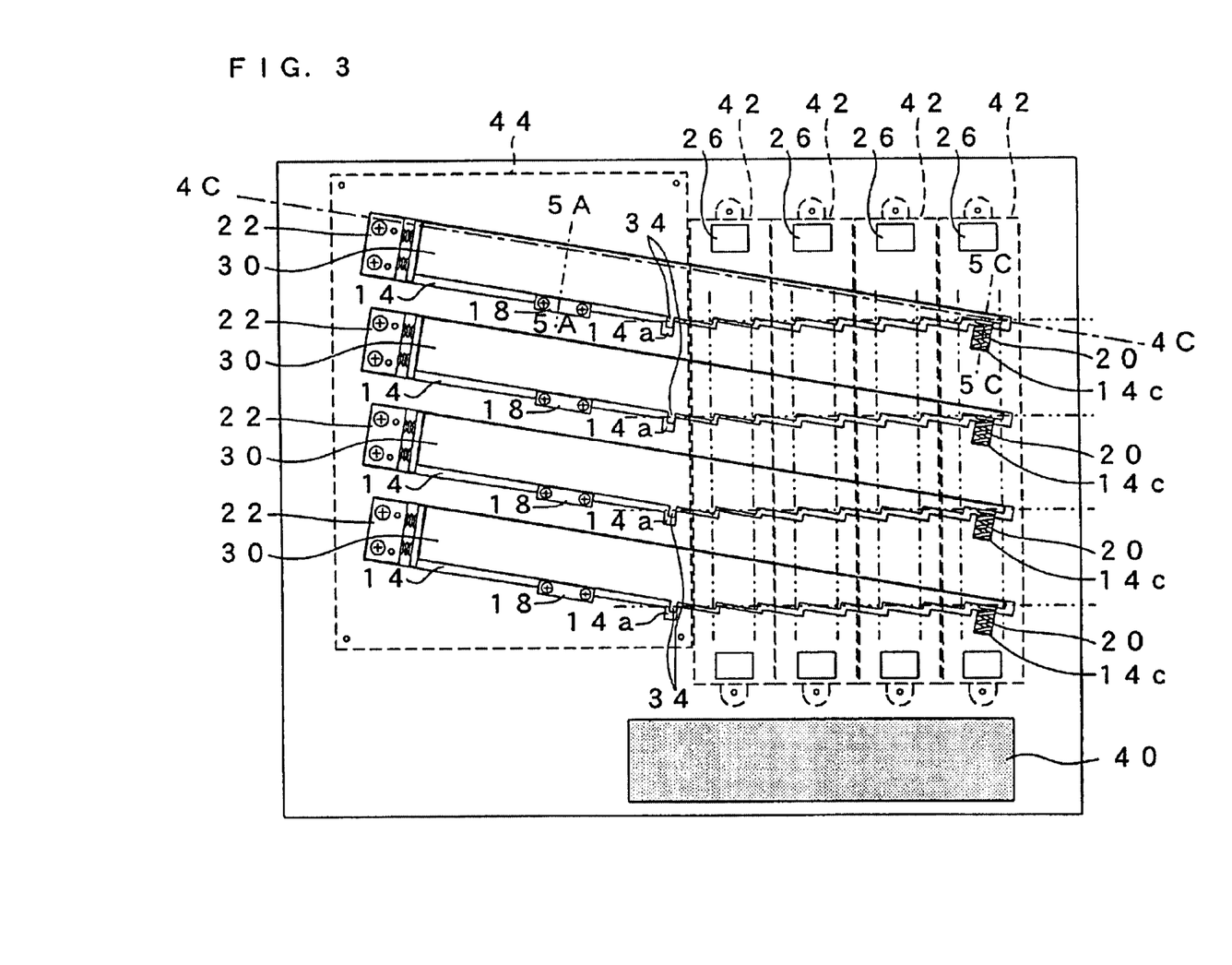
FIG. 3 is a plan view of an optical back plane board according to the present embodiment seen from the upper direction.

As shown in FIGS. 1 trough 3, an optical back plane board 2 in the present embodiment comprises an optical data bus fixing board 10, including a flat plate 12 of synthetic resin, a plurality of optical data buses 30 fixed, respectively, within a plurality of (e.g. four (4) in the present embodiment) recesses for insertion of an optical data bus 14, and a printed circuit board 40 fixed within a recess for insertion of a printed circuit board 16 (see FIG. 2). On the printed circuit board 40, where a power supply line and an electrical signal transmission line are provided, electronic components for processing signals are mounted if required. The configuration or assembly method of the printed circuit board 40, however, will not be discussed herein since the printed circuit board 40 does not constitute a particular feature of the present invention.

Figure 4A:
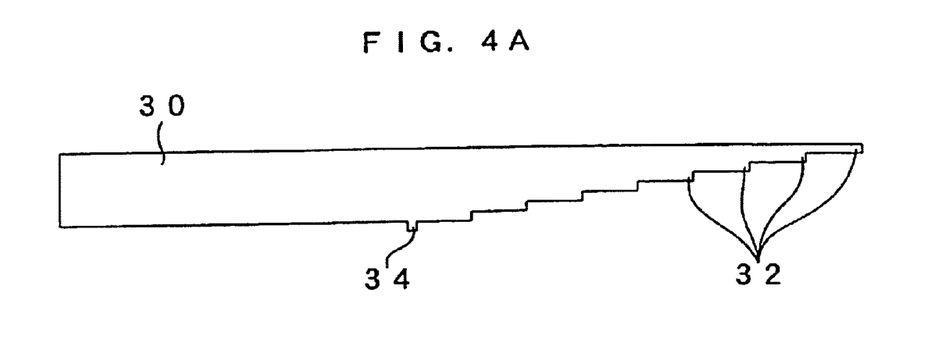
FIGS. 4A through 4D are explanatory views showing the structure of a first holding member and the optical data bus according to the present embodiment.
Figure 4B:
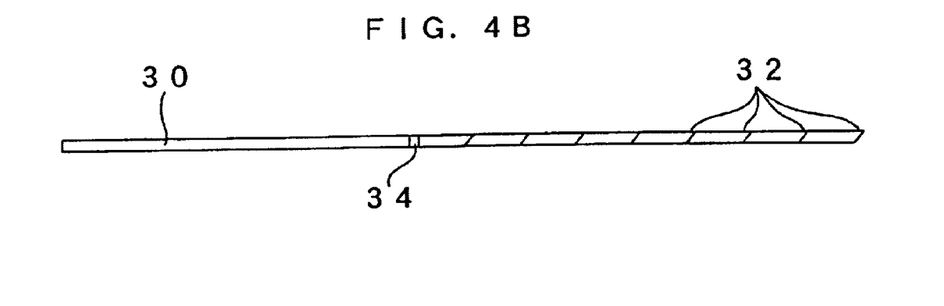

As shown in FIGS. 4A and 4B, the optical data bus 30 has basically the sane structure as an optical data bus 50 shown in FIGS. 6A through 6C. The optical data bus 30 comprises a generally rectangular substrate of light transmissive resin having one longitudinal side thereof formed into a step-wise configuration, and each longitudinal end of each of the steps is sloped at 45 degrees in relation to the surface of the substrate in order to form a signal light incoming/outgoing area 32. In addition, the side wall of the optical data bus 30 along the longitudinal direction is provided with a positioning projection 84 such that the optical data bus 30 is precisely positioned within the recess for insertion of the optical data bus 14. FIG. 4A is a plan view of the optical data bus 30 and FIG. 4B is a side view of the same.

As clearly shown in FIGS. 1 and 3, the recess for insertion of an optical data bus 14 formed in a flat plate 12 has approximately the same configuration as the surface configuration of the optical data bus 30, which allows easy insertion of the optical data bus 30 into the recess. The recess for insertion of an optical data bus 14 also has a contour larger than the optical data bus 30 in order to avoid causing interference with the optical data bus 30 even when the optical data bus 30 is thermally expanded.

As shown in FIG. 2, a side wall of the recess for insertion of an optical data bus 14 along the longitudinal direction of the optical data bus 30 (a side wall corresponding to the longitudinal side of the optical data bus 30 formed into a step-wise configuration) is provided with an engaging portion 14a for precisely positioning the optical data bus 30 by receiving the positioning projection 34 which protrudes from the side wall of the optical data bus 30 when the optical data bus 30 is inserted into the recess for insertion of an optical data bus 14; a second holding member fixing portion 14b for fixing a second holding member 18; and a warpage preventing member fixing portion 14c for fixing the warpage preventing member 20 which presses and biases the side wall of the top end portion of the optical data bus 30 on the side with the signal light incoming/outgoing areas.

Figure 5A:
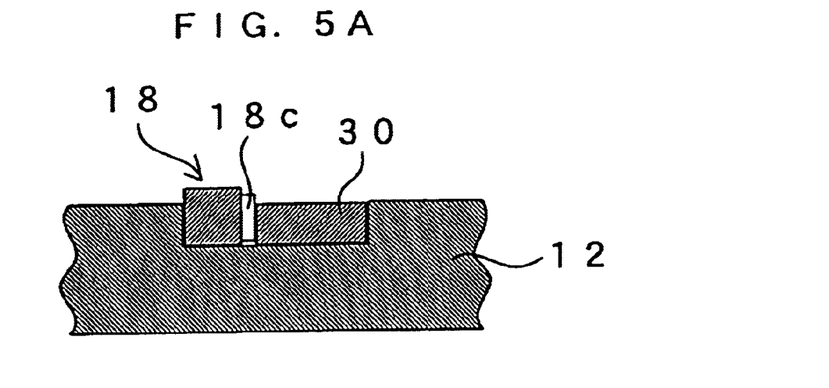
FIGS. 5A through 5C are explanatory views showing the structure of a second holding member and a warpage preventing member according to the embodiment.

The second holding member 18 is provided, as shown in the sectional view of FIG. 5A, for sandwiching the optical data bus 30 with the aid of the opposite inner wall of the recess for insertion of an optical data bus 14 by pressing and biasing the side wall of the optical data bus 30 along the longitudinal direction, whereby the optical data bus 30 is securely held within the recess for insertion of an optical data bus 14.

Figure 5B:
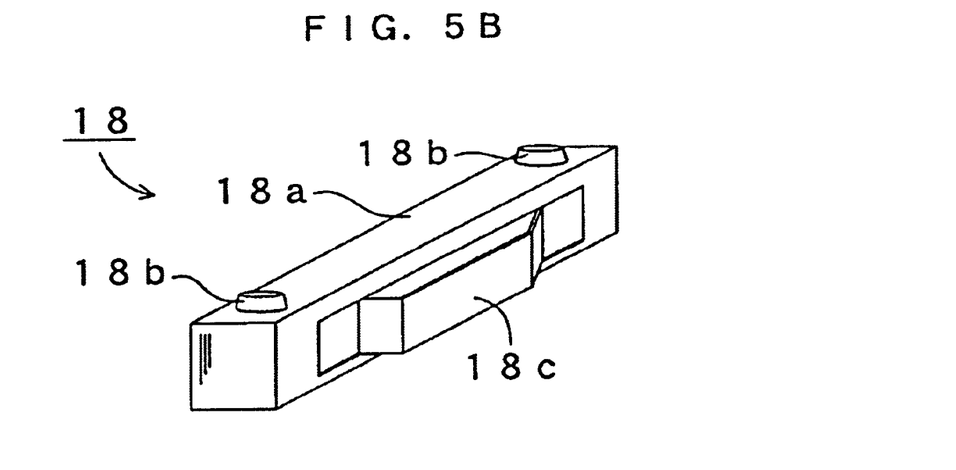

As shown in the perspective view of FIG. 5B, the second holding member 18, which comprises a main body 18a made of synthetic resin, screws 18b for fixing the main body 18a within the second holding member fixing portion 14b formed in the flat plate 12 and a flat spring 18c embedded in a side wall of the main body 18a, presses and biases the side wall of the optical data bus 30 utilizing elasticity of the flat spring 18c.

Figure 5C:
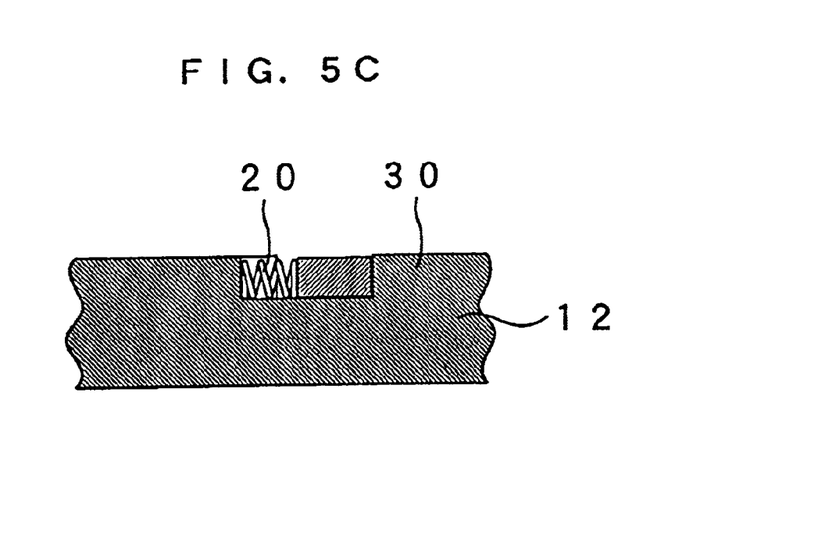

The warpage preventing member 20, which is provided for preventing the top end portion of the optical data bus 30 from warping by pressing and biasing the side wall of the top end portion of the optical data bus 30, is a coil spring in the present embodiment, as shown in FIG. 5C. Since the optical data bus 30 is a resin substrate with one side having a step-wise configuration in order to form a plurality of signal light incoming/outgoing areas 32, the closer to the top end in the longitudinal direction of the step-wise configuration, the smaller the width of becomes. Accordingly, the top end portion of the optical data bus 30 formed into a step-wise configuration tends to warp, for example, under the influence of heat, toward the side on which the signal light incoming/outgoing areas 32 are formed. Once the top end portion warps, incoming and outgoing of light through the signal light incoming/outgoing area 32 located at the top end portion cannot be performed properly. Thus, in the present embodiment, the warpage preventing member 20 comprising a coil spring is employed for pressing and biasing the side wall of the top end portion of the optical data bus 30, thereby to prevent the top end portion of the optical data bus 30 from warping.

FIG. 5A is a sectional view showing the cut surface of the second holding member 18 and the optical data bus 30 along line 5A—5A in FIG. 3, and FIG. 5C is a sectional view showing the cut surface of the warpage preventing member 20 and the optical data bus 30 along line 5C—5C in FIG. 3.

The recess for insertion of the optical data bus 14 formed in the flat plate 12 has a back end portion which is relatively large in order to house a first holding member 22 at the opposite end to the signal light incoming/outgoing areas 32 of the optical data bus 30. The first holding member 22 is inserted and fixed into the back end portion of the recess for insertion of the optical data bus 14 to hold the optical data bus 30 within the recess for insertion of the optical data bus 14 by pressing and biasing the end surface (back end surface) of the optical data bus 30 opposite to the signal light incoming/outgoing areas 32 in the direction of the top end portion having the signal light incoming/outgoing areas 32.

Figure 4C:
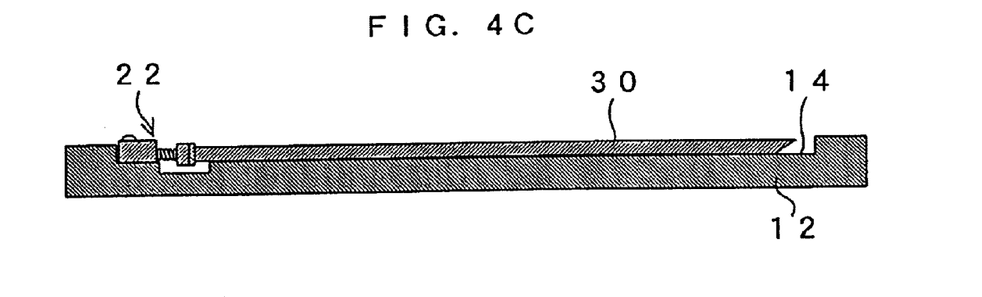
Figure 4D:
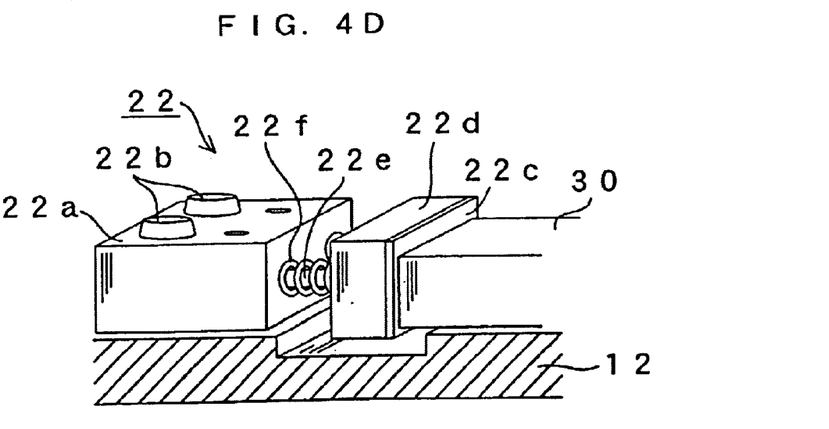

Specifically, the first holding member 22 comprises, as shown in FIGS. 4C and 4D, a main body 22a made of synthetic resin to be fixed into the back end portion of the recess for insertion of the optical data bus 14; screws 22b for fixing the main body 22a; a light diffusion film 22c (for example, a reflective diffusion sheet produced by Physical Optics Corporation, model No. LORS0.2×40PCB-MB); a reflective diffusion plate 22d to which the light diffusion film 22c is attached with its light reflective surface outward; a pair of sustaining bars 22e for sustaining the reflective diffusion plate 22d while allowing the same to approach or recede from the main body 22a; and coil springs 22f provided around the sustaining bars 22e as a biasing member. The snapping force of the coil spring 22f causes the reflective diffusion plate 22d (specifically the reflective surface of the light diffusion film 22c) to abut the back end surface of the optical data bus 30, and at the same time to press and bias the optical data bus 30 from the back end toward the top end, with the result that the portion of the optical data bus 30 from the positioning projection 34 to the back end thereof is fixedly held between the first holding member 22 and the engaging portion 14a.

FIG. 4C is a sectional view showing the cut surface of the first holding member 22 and the optical data bus 30 along line 4C—4C in FIG. 3, and FIG. 4D is a perspective view of the first holding member 22. As shown in FIG. 4D, the reflective diffusion plate 22d is configured to be larger than the back end surface of the optical data bus 30 in order to prevent light leakage from the back end of the optical data bus 30. The main body 22a is additionally provided with spare holes for insertion of screws 22b for fixing.

In the surface of the flat plate 12, which constitutes the optical data bus fixing board 10 in the present embodiment, holder positioning recesses 26 are provided, in addition to the above described recess for insertion of an optical data bus 14 and the recess for insertion of a wiring substrate 16 for positioning an element holder 42 (indicated by dotted lines in FIG. 3), for holding a light emitting element (such as a laser diode, LD) and a light receiving element (such as a photo diode PD).

The element holder 42 is disposed on the optical data bus 30 fixed within the recess for insertion of an optical data bus 14, for arranging the light emitting elements or the light receiving elements at the positions opposed, respectively, to the signal light incoming/outgoing areas 32 of each optical data bus 30. In the present embodiment, the element holder 42 is provide with a positioning projection protruding from the bottom end of the element holder 42, which engages with the holder positioning recesses 26. Therefore, the element holder 42 (furthermore the light emitting elements or the light receiving elements held by the holder) can easily be positioned and fixed to the optical data bus fixing board 10.

It is to be noted that if the recesses for insertion of an optical data bus 14 are formed such that the optical data buses 30 are arranged along the side wall of the rectangular flat plate 12, it will be difficult to properly position the light emitting elements or the light receiving elements in relation to the signal light incoming/outgoing areas 32, respectively, since the signal light incoming/outgoing areas 32 are provided at the respective steps formed along the longitudinal direction of the optical data bus 30.

To avoid the difficulty mentioned above, the recesses for insertion of an optical data bus 14 are formed in the present embodiment, as indicated by chain double-dashed lines in FIG. 3, such that when the optical data buses 30 are fixed within the recesses for insertion of an optical data bus 14, respectively, the signal light incoming/outgoing areas 32 are aligned on an orthogonal grid along the outer shape of the flat plate 12.

As described above, in the optical back plane board 2 of the present embodiment, a plurality of the optical data buses 30 are inserted into the recesses for insertion of an optical data bus 14 formed in the surface of the flat plate 12, then fixed within the recesses for insertion of an optical data bus 14 by pressing and biasing the optical data buses 30 from two directions utilizing the first holding members 22 disposed at the back end of the optical data buses 30 and the second holding members 18 disposed on the side of the side wall along the longitudinal direction of the optical data buses 30.

Accordingly, the optical back plane board 2 of the present embodiment (in other words, the optical data bus fixing board 10) enables fixation of the optical data buses 30 to the optical data bus fixing board 10 without using an adhesive or the like and prevents decrease of optical transmission efficiency in the optical data bus.

Furthermore, the light emitting element and the light receiving element are arranged at the optimum positions, respectively, in relation to the signal light incoming/outgoing area 32 of the optical data bus 30 by using the holder positioning recesses 26 formed in the surface of the flat plate 12 and the element holder 42. This also contributes to prevent decrease of optical transmission efficiency.

The first holding member 22 including the reflective diffusion plate 22d holds the optical data bus 30 by pressing the reflective diffusion plate 22d against the back end surface of the optical data bus 30. Thus, the use of the optical data bus fixing board 10 of the present embodiment makes it unnecessary to previously form a reflective diffusion portion at the back end surface of the optical data bus 30, which simplifies production of an optical data bus. In addition, since it is unnecessary to bond a reflective diffusion portion onto the optical data bus 30, the reflective diffusion characteristics of light in the optical data bus 30 can be made optimum.

In view of the above, the use of an optical back plane board 2 comprising the optical data bus 30 as a signal transmission medium enables interconnection of a plurality of circuits with ease and without causing transmission loss. This may facilitate an achievement of an information processing unit including a parallel architecture which supports increasing the speed of transmission and enables interconnection of multiple nodes with a simple structure.

Although an embodiment according to the present invention is described above, the present invention should not be limited to the embodiment but may be embodied in various forms.

For example, while only a single second holding member 18 is provided along the side wall of the optical data bus 30 in the above described embodiment, a plurality of second holding members 18 may be provided for one optical data bus 30. In contrast, the second holding member 18 may be omitted in the case where the first holding member 22 can fully hold the optical data bus 30 by itself.

While the flat plate 12 is made of synthetic resin and is provided with the recess for insertion of the printed circuit board 16 for fixing the printed circuit board 40 therein, the flat plate 12 may be made of metal, or may be a printed circuit board in itself. The flat plate 12 is not necessarily provided with the recess for insertion of the printed circuit board 16 to fix a printed circuit board, but may be provided only with a screw hole for fixing the same.

Furthermore, while four recesses for insertion of the optical data bus 14 are formed to allow fixation of four optical data buses 30 onto the optical data bus fixing board 10, the number of recesses for insertion of the optical data bus 14 may be adjusted depending on the intended use of the optical data bus fixing board 10.

The coil spring 22f of the first holding member 22, the flat spring 18c of the second holding member 18, or the coil spring constituting the warpage preventing member 20 for preventing the warpage of the optical data bus 30 may be replaced by a buffer material, such as rubber, or a spring of another type.

When, in the above described embodiment, the optical data buses 30 are fixed onto the optical data bus fixing board 10, then the element holders 42 holding the light emitting elements and the light receiving elements are disposed over the optical data buses 30, the signal light incoming/outgoing areas 32 of the optical data buses 30 are covered with the element holders 42. The remaining portions (the back end half of the optical data buses 30), which are exposed to the outside, are preferably covered with a separate protection plate 44 made of plastic, for example, as shown in FIG. 3.

What is claimed is:

1. An optical data bus fixing board for fixing an optical data bus relative to light emitting elements and light receiving elements arranged between a first and second end of the optical data bus, the optical data bus being made of a long plate of light transmissive material having a configuration including a first longitudinal side formed into a plurality of steps defining signal light incoming and outgoing areas formed by sloping a longitudinal end of each of the plurality of steps at approximately 45 degrees in relation to a surface of the optical data bus, the optical data bus fixing board comprising:

a flat plate provided with a recess for insertion of the optical data bus, the recess having a contour corresponding to the configuration of the optical data bus and a positioning portion formed for positioning each of the signal light incoming and outgoing areas of the optical data bus relative to one of the light emitting elements and the light receiving elements;

a first holding member for holding the optical data bus inserted into said recess on a second longitudinal side opposite to the first longitudinal side having the plurality of steps defining signal light incoming and outgoing areas; and wherein said first holding member being provided with a reflective diffusion plate for abutting one of the first and second ends of the optical data bus opposite to the sloped longitudinal ends of each of the plurality of steps defining the signal light incoming and outgoing areas, the reflective diffusion plate reflecting the light through one of the signal light incoming and outgoing areas to another of the signal light incoming and outgoing areas.

2. The optical data bus fixing board according to claim 1, wherein said flat plate comprises one of a resin, a metal and a printed circuit board.

3. The optical data bus fixing board according to claim 1, wherein said flat plate is provided with a plurality of said recesses such that when a plurality of optical data busses are inserted, respectively, into said recesses, the signal light incoming and outgoing areas of the respective optical data buses are aligned on an orthogonal grid.

4. The optical data bus fixing board according to claim 1, wherein said first holding member includes an elastic member for pressing and biasing said reflective diffusion plate against one of the first and second ends of the optical data bus and holds the optical data bus using the biasing force of said elastic member.

5. The optical data bus fixing board according to claim 4, wherein said elastic member for pressing and biasing said reflective diffusion plate to the end surface of the optical data bus comprises a coil spring.

6. The optical data bus fixing board according to claim 1, further comprising a second holding member for holding the optical data bus inserted into said recess for insertion of an optical data bus by one side wall of the optical data bus along the longitudinal direction.

7. The optical data bus fixing board according to claim 6, wherein said second holding member includes an elastic member for pressing and biasing the side wall of the optical data bus and holds the optical data bus using the biasing force of said elastic member.

8. The optical data bus fixing board according to claim 7, wherein said elastic member for pressing and biasing the side wall of the optical data bus comprises a flat spring.

9. The optical data bus fixing board according to claim 1, wherein the contour of said recess is larger than an outer contour shape of the optical data bus, and wherein a longitudinal side wall of said recess is provided with an engaging portion corresponding to a positioning projection formed on the first longitudinal side wall of the optical data bus.

10. An optical back plane board comprising the optical data bus fixing board according to claim 1 in conjunction with the optical data bus inserted into the recess in said optical data bus fixing board.

11. An optical data bus fixing board for facilitating optical transmission between an optical data bus secured by the optical data bus fixing board and at least one of a light emitter device and a light receiver device optically communicating with the optical data bus, the optical data bus fixing board comprising:

a substantially planar surface defining at least a recess sized to accommodate an optical data bus having a plurality of light deflecting boundaries optically communicating with at least one of the light emitter device and the light receiver device;

a first holding mechanism for securing the optical data bus in the recess, the holding mechanism comprising a springably biased contact plate having a reflective diffusion portion directly contacting an end of the optical data bus and aligned substantially opposite and optically communicating with the plurality of light deflecting boundaries.

12. The optical data bus fixing board as set forth in claim 11 wherein the reflective diffusion portion is integrally secured to the contact plate of the holding mechanism and is springably biased by the holding mechanism into direct contact with the end of the optical data bus without any adhesive or other material interposed between the reflective diffusion portion and the end of the optical data bus.

13. The optical data bus fixing board as set forth in claim 11 further comprising a side wall of the recess being spaced from a respective adjacent side wall of the optical data bus by a second holding mechanism having a springable member sandwiched between the side wall of the recess and the side wall of the optical data bus.

14. The optical data bus fixing board as set forth in claim 13 further comprising a longitudinal alignment mechanism wherein the recess is provided with an alignment detent in the side wall of the recess for engagement with a corresponding alignment protuberance in the adjacent side wall of the optical data bus.

15. The optical data bus fixing board according to claim 11, wherein the optical data bus fixing board comprises one of a resin, a metal and a printed circuit board.

16. The optical data bus fixing board according to claim 11, wherein said substantially planar surface is provided with a plurality of said recesses such that when a plurality of optical data busses are inserted, respectively, into said recesses, the plurality of light deflecting boundaries of the respective optical data buses are aligned on an orthogonal grid.

17. The optical data bus fixing board according to claim 11, wherein said first holding member further comprises a coil spring biasing said contact plate and reflective diffusion portion to the end surface of the optical data bus.

18. The optical data bus fixing board according to claim 13, wherein said second holding member includes an elastic member for pressing and biasing the side wall of the optical data bus and secures the optical data bus in the recess using the biasing force of said elastic member.

19. The optical data bus fixing board according to claim 18, wherein said elastic member for pressing and biasing the side wall of the optical data bus comprises a flat spring.

20. A method for increasing the optical transmission efficiency between an optical data bus secured to an optical data bus fixing board and at least one of a light emitter device and a light receiver device optically communicating with the optical data bus, the method comprising the steps of:

forming a substantially planar surface defining at least a recess sized to accommodate an optical data bus having a plurality of light deflecting boundaries optically communicating with at least one of the light emitter device and the light receiver device;

securing the optical data bus in the recess via a first holding mechanism comprising a springably biased contact plate having a reflective diffusion portion directly contacting an end of the optical data bus and aligned substantially opposite and optically communicating with the plurality of light deflecting boundaries; and integrally securing the reflective diffusion portion to the contact plate of the holding mechanism and springably biasing the reflective diffusion portion into direct contact with the end of the optical data bus without any adhesive or other material interposed between the reflective diffusion portion and the end of the optical data bus.

* * * * *